United States Patent
Elien et al.

(10) Patent No.: US 9,813,403 B2
(45) Date of Patent: *Nov. 7, 2017

(54) SECURING COMMUNICATIONS WITH ENHANCED MEDIA PLATFORMS

(71) Applicant: MICROSOFT TECHNOLOGY LICENSING, LLC, Redmond, WA (US)

(72) Inventors: Jean-Emile Elien, Bellevue, WA (US); Daniel Collins Balma, Paris (FR); Rocco Crea, III, Issaquah, WA (US); Michael Brendan Frei, Seattle, WA (US); Paul Stephen Hellyar, Kirkland, WA (US); Victor Tan, Kirkland, WA (US); Kye Hyun Kim, Seattle, WA (US); Travis J. Muhlestein, Redmond, WA (US); Robert S. Unoki, Redmond, WA (US); Kenneth Michael Bayer, Kirkland, WA (US); Wes Wahlin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,294

(22) Filed: Jul. 19, 2016

(65) Prior Publication Data

US 2016/0330188 A1    Nov. 10, 2016

Related U.S. Application Data

(63) Continuation of application No. 14/309,417, filed on Jun. 19, 2014, now Pat. No. 9,413,738.

(51) Int. Cl.
*H04L 29/06*   (2006.01)
*H04L 9/32*    (2006.01)
(Continued)

(52) U.S. Cl.
CPC .............. *H04L 63/08* (2013.01); *A63F 13/30* (2014.09); *A63F 13/352* (2014.09); *A63F 13/71* (2014.09);
(Continued)

(58) Field of Classification Search
None
See application file for complete search history.

(56) References Cited

U.S. PATENT DOCUMENTS

| 2003/0041253 A1 | 2/2003 | Matsui et al. |
| 2003/0229779 A1 | 12/2003 | Morais et al. |

(Continued)

FOREIGN PATENT DOCUMENTS

| EP | 1238690 A2 | 9/2002 |
| EP | 1310284 A2 | 5/2003 |

OTHER PUBLICATIONS

International Search Report received for PCT Application No. PCT/US2015/036158, dated Oct. 6, 2015, 6 pages.
(Continued)

*Primary Examiner* — Malcolm Cribbs
(74) *Attorney, Agent, or Firm* — Shook, Hardy & Bacon L.L.P.

(57) ABSTRACT

Various methods and systems for securing communications with enhanced media platforms, are provided. In particular, an enhanced media platform is authenticated using a trusted location. The authenticated enhanced media platform establishes a bidirectional trust with an enhanced remote location, the enhanced media platform being stored in the enhanced remote location. Upon authentication and establishing the bidirectional trust, the enhanced media platform may securely communicate media content in a media content distribution service infrastructure while supporting custom functionality. The method for securing communications with
(Continued)

enhanced media platforms includes communicating authentication credentials to an internal security component at the trusted location. The method further includes receiving validation credentials from the internal security component. The method also includes authenticating the enhanced remote location based on at least a portion of the validation credentials received. The method further includes establishing the bidirectional trust relationship with the enhanced remote location using the validation credentials.

20 Claims, 10 Drawing Sheets

(51) Int. Cl.
G06F 21/33 (2013.01)
A63F 13/73 (2014.01)
A63F 13/352 (2014.01)
A63F 13/30 (2014.01)
A63F 13/71 (2014.01)
H04L 29/08 (2006.01)

(52) U.S. Cl.
CPC .............. *A63F 13/73* (2014.09); *G06F 21/33* (2013.01); *H04L 9/3263* (2013.01); *H04L 9/3265* (2013.01); *H04L 63/0428* (2013.01); *H04L 63/06* (2013.01); *H04L 67/20* (2013.01); *A63F 2300/401* (2013.01); *G06F 2221/2109* (2013.01); *G06F 2221/2129* (2013.01); *H04L 63/0823* (2013.01); *H04L 67/1097* (2013.01); *H04L 67/28* (2013.01)

(56) References Cited

U.S. PATENT DOCUMENTS

| | | | |
|---|---|---|---|
| 2006/0020784 A1* | 1/2006 | Jonker | G06F 21/10 713/157 |
| 2007/0079115 A1 | 4/2007 | Kresina | |
| 2007/0143629 A1 | 6/2007 | Hardjono et al. | |
| 2007/0256125 A1 | 11/2007 | Chen et al. | |
| 2009/0007104 A1* | 1/2009 | Zimmer | G06F 21/606 718/1 |
| 2009/0222910 A1 | 9/2009 | Le Bihan et al. | |
| 2010/0212016 A1* | 8/2010 | Dubhashi | G06F 21/10 726/26 |
| 2010/0241753 A1 | 9/2010 | Garbajs et al. | |
| 2011/0063093 A1* | 3/2011 | Fung | G06Q 10/06 340/10.52 |
| 2011/0265158 A1 | 10/2011 | Cha et al. | |
| 2011/0283365 A1* | 11/2011 | Moritz | G06F 21/10 726/28 |
| 2012/0159575 A1 | 6/2012 | Fukui et al. | |
| 2012/0278869 A1 | 11/2012 | Guccione et al. | |
| 2012/0328101 A1* | 12/2012 | Lakshminarayanan | H04L 63/0823 380/258 |
| 2013/0086385 A1* | 4/2013 | Poeluev | G06F 12/1416 713/176 |
| 2013/0121489 A1* | 5/2013 | Pestoni | H04L 9/0822 380/210 |
| 2013/0227281 A1 | 8/2013 | Kounga et al. | |

OTHER PUBLICATIONS

Second Written Opinion issued in PCT Application No. PCT/US2015/036158, dated May 20, 2016, 6 pages.
International Preliminary Report on Patentability dated Sep. 5, 2016 in International Application No. PCT/US2015/036158, 7 pages.

* cited by examiner

SECURING COMMUNICATIONS WITH ENHANCED MEDIA PLATFORMS

CROSS-REFERENCE TO RELATED APPLICATIONS

This application is a continuation of, and claims priority to, pending U.S. application Ser. No. 14/309,417, filed Jun. 19, 2014, "SECURING COMMUNICATIONS WITH ENHANCED MEDIA PLATFORMS" which is incorporated herein by reference in its entirety.

BACKGROUND

In a media content distribution service, guaranteeing the security of media content is of particular importance. Several different types of security measures may be implemented to protect the media content. Advances in the architecture of the media content distribution service infrastructure may make the media content less secure unless additional security measures are implemented. Conventional methods for protecting media content do not contemplate these architectural advances. In this regard, the methods fail to enable, in a secure manner, the media content distribution service infrastructure to take advantage of the architectural advances and the additional supported functionality available.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for securing communications with enhanced media platforms. In particular, an enhanced media platform is authenticated using a trusted location. The authenticated enhanced media platform establishes a bidirectional trust with an enhanced remote location, the enhanced media platform being stored in the enhanced remote location. Upon authentication and establishing the bidirectional trust, the enhanced media platform may securely communicate media content in a media content distribution service infrastructure while supporting custom functionality. The method for securing communications with enhanced media platforms includes communicating authentication credentials to an internal security component at the trusted location. The method further includes receiving validation credentials from the internal security component. The method also includes authenticating the enhanced remote location based on, at least, a portion of the validation credentials received. The method further includes establishing the bidirectional trust relationship with the enhanced remote location using the validation credentials.

BRIEF DESCRIPTION OF THE DRAWINGS

Embodiments of the invention are described in detail below with reference to the attached drawing figures, wherein.

DETAILED DESCRIPTION

Figure 1:
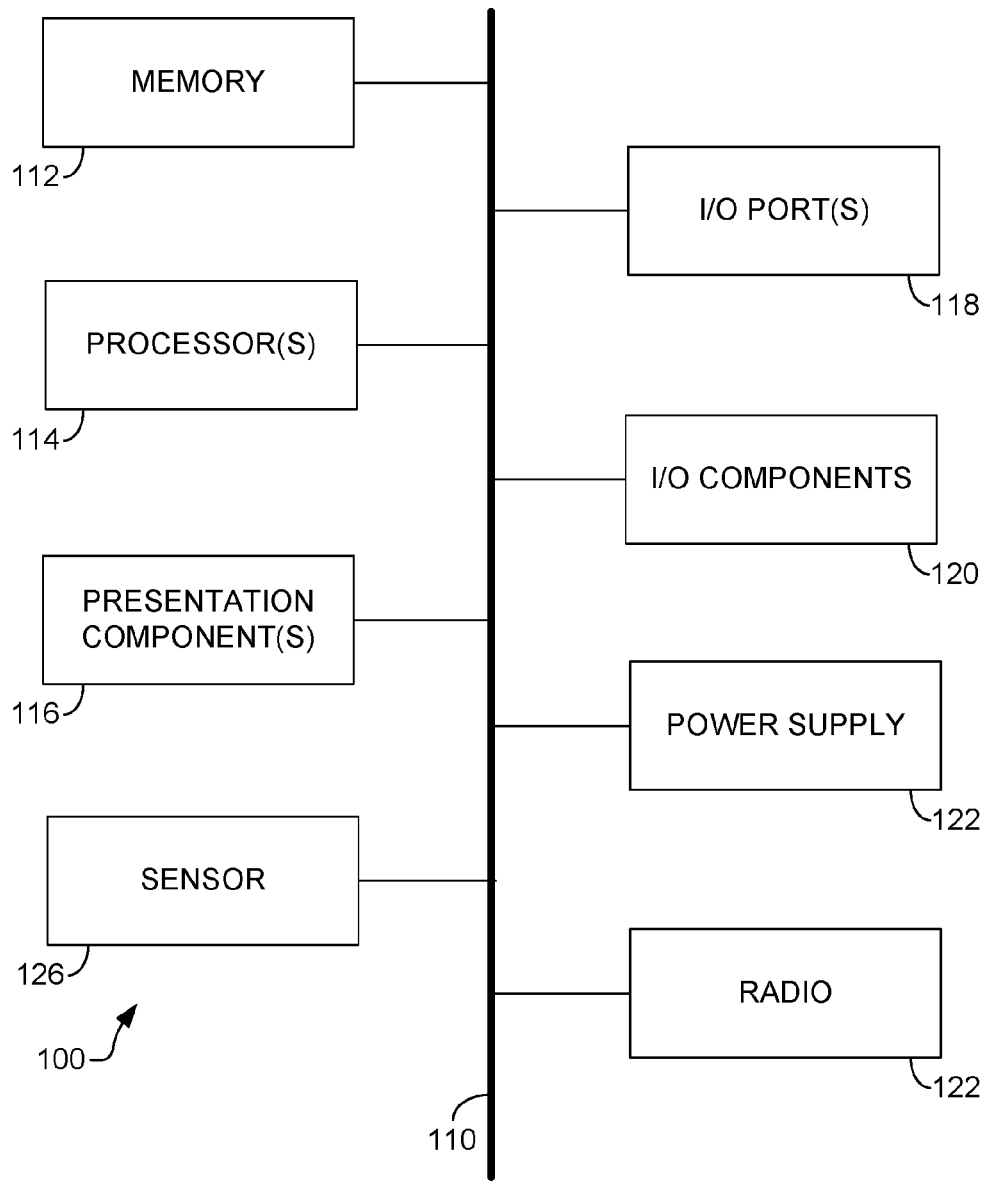
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Various aspects of the technology described herein are generally directed to systems, methods, and computer storage media for, among other things, securing communications with enhanced media platforms. A media platform (e.g., game console or computing device) may communicate with a media content distribution service. A media content distribution service may comprise one or more media content delivery servers to provide different types of digital media content. A media platform may support the several different types of digital media content. The media platform may include several different control components (e.g., remotes or controllers) and interface components (e.g., display interface, gesture interface) that allow users to use the media content.

The media platform may also include direct access to digital media content and/or support applications for accessing digital media content. Digital media content ("media content") may generally refer to information delivered to an end-user in specific contexts (e.g., listening to music, watching movies, playing video games). Media content may be accessed locally (e.g., local hard drives, CD-ROM discs) or remotely accessed via broadcast or streaming from media storage (e.g., storage disks) to a display associated with the media platform. Media content may be associated with a provider of the media content distribution service as a developer or a publisher of media content developed by a third party.

Media platforms today are generally configured for household implementation. For instance, a user purchases a media platform and accesses media content from their home as local content or remote content or a combination thereof. The use of household herein is not meant to be limiting but rather contemplates different types of consumer grade media platforms. Household use of a media platform may make the media platform and media content vulnerable to security breaches. For example, a media platform associated with a user account may become compromised if the media platform and/or user account is misappropriated and thus affect access to media content or expose media content to piracy. Currently, there are different types of security checks, user authentication procedures, and security proofs implemented to mitigate and eliminate the chances for security breaches.

With advances in the architecture of media content distribution service infrastructures, media platforms for household-based implementation may be reconfigured as enhanced versions of media platforms in a datacenter-based implementation that supports additional functionality. For example, enhanced media platforms may be implemented in geo-distributed datacenters to support custom functionality that improve the user experience. These advancements in architecture may expose the media content distribution service to different types of security risks that have to be addressed. Conventional methods for protecting media content do not contemplate these architectural advances and in this regard fail to enable the media content distribution service infrastructure to take advantage of the architectural advances and the additional supported custom functionality in a secured manner.

Embodiments of the present invention provide efficient and simple methods and systems for securing communications with enhanced media platforms. At a high level, an enhanced media platform is a media platform that generally shares the same architecture of a traditional household media platform; however, instead of a household-based implementation, the media platform may be implemented via a remote datacenter (e.g., enhanced remote location). Upon installation of the enhanced media platform in the remote datacenter, the enhanced media platform may be authenticated such that the authenticated enhanced media platform establishes a bidirectional trust with the remote datacenter in which the enhanced media platform is stored.

In operation, the enhanced media platform in a remote datacenter (e.g., enhanced remote location) is first authenticated. Authentication confirms that the enhanced media platform is an approved enhanced media platform. It is contemplated that the enhanced media platform may be authenticated based on secure authentication information embedded in the hardware of the enhanced media platform during a manufacturing process. In addition, the remote datacenter may be geo-distributed and also not owned and/or controlled by the provider of the media content distribution service. The enhanced media platform may communicate authentication credentials to a trusted datacenter (e.g., trusted location) of the provider of the media content distribution service. The datacenter is trusted in that it may be owned and/or controlled by the provider of the of the media content distribution service. The media service provider trusted datacenter implements, among other things, services and a hardware security module (HSM) to authenticate the enhanced media platform based on the received authentication credentials. The enhanced media platform may be authenticated with manufacture-based secure authentication information using a hardware-based authentication feature. The authentication process may include the provider trusted datacenter communicating validation credentials (e.g., X509 certificate signed with a root certificate) to the enhanced media platform.

Upon authentication, the enhanced media platform may, based on at least a portion of the validation credentials, establish a bidirectional trust with the remote datacenter in which the enhanced media platform is stored. In embodiments, the enhanced media platform performs firmware and/or software updates to facilitate performing tasks in the authentication process. The enhanced media platform may securely communicate with the remote datacenter based on establishing that the enhanced platform is running in an approved enhanced remote location. The enhanced media platform may further securely communicate media content in a media content distribution service infrastructure. For example, the enhanced media platform can communicate more efficiently communicate with internal and third party media delivery services servers. In this regard, the publishers and third party providers of content are guaranteed the security of the media content while reducing the previous security overhead of the media deliver services servers. In addition, because the enhanced media platform runs in an enhanced remote location, the enhanced media platform may further support custom functionality. The custom functionality may further distinguish a datacenter-based enhanced media platform from a household-based media platform. It is contemplated that both may be implemented simultaneously, from their respective locations, as part of the media content distribution service.

In a first aspect of the present invention, a method for securing communications with enhanced media platforms is provided. The method includes communicating authentication credentials to an internal security component. The internal security component is in a trusted location. The method also includes receiving validation credentials from the internal security component. The method further includes authenticating running in an enhanced remote location based at least on a portion of the validation credentials. The method includes establishing a bidirectional trust with the enhanced remote location using the validation credentials.

In a second aspect of the present invention, one or more computer storage media storing computer-useable instructions that, when used by one or more computing devices, cause the one or more computing devices to perform a method for securing communications with enhanced media platforms. The method includes receiving authentication credentials from an enhanced remote location. The enhanced remote location includes an external security component and an enhanced media platform. The method also includes authenticating the enhanced media platform based on manufacture-based secure authentication information. The method further includes communicating validation credentials to the external security component. The validation credentials include at least a certificate signed with a root authority and identification information of the enhanced media platform. The validation credentials facilitate authenticating the enhanced media platform and establishing a bidirectional trust between the authenticated enhanced media platform and the enhanced remote location.

In a third aspect of the present invention, a system for securing communications with enhanced media platforms is provided. The system includes an enhanced media platform configured for communicating authentication credentials. The enhanced media platform is also configured for receiving at least a first portion of the validation credentials. The enhanced media platform is further configured for authenticating running in an enhanced remote location based at least on the first portion of the validation credentials. The enhanced media platform is also configured for communicating a request for a second portion of the validation credentials. The enhanced media platform is configured for receiving the second portion of the validation credentials. The enhanced media platform is also configured for establishing a bidirectional trust with the enhanced remote location based on receiving the second portion of the validation credentials.

The system also includes an external security component. The external security component is configured for communicating the authentication credentials to a trusted location. The external security component is also configured for receiving the validation credentials from the trusted location. The external security component is further configured for communicating at least the first portion of the validation credentials to the enhanced media platform. The external security component is also configured for receiving the request for the second portion of the validation credentials. The external security component is configured for communicating the second portion of the validation credentials to the enhanced media platform.

The system further includes an internal security component. The internal security component configured for receiving the authentication credentials from the external security component. The internal security component also configured for authenticating the enhanced media platform. The internal security component is configured for communicating the validation credentials to the external security component.

In a fourth aspect of the present invention, a method for securing communications with enhanced media platforms is provided. The method includes receiving a request to access media content. The method further includes determining that the request is associated with an enhanced media platform attempting to access the media content. The enhanced media platform is located in an enhanced remote location with a bidirectional trust between the enhanced media platform and the enhanced remote location. The method also includes excluding the enhanced media platform from one or more security procedures associated with accessing the media content.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from memory entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits and/or receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Figure 2:
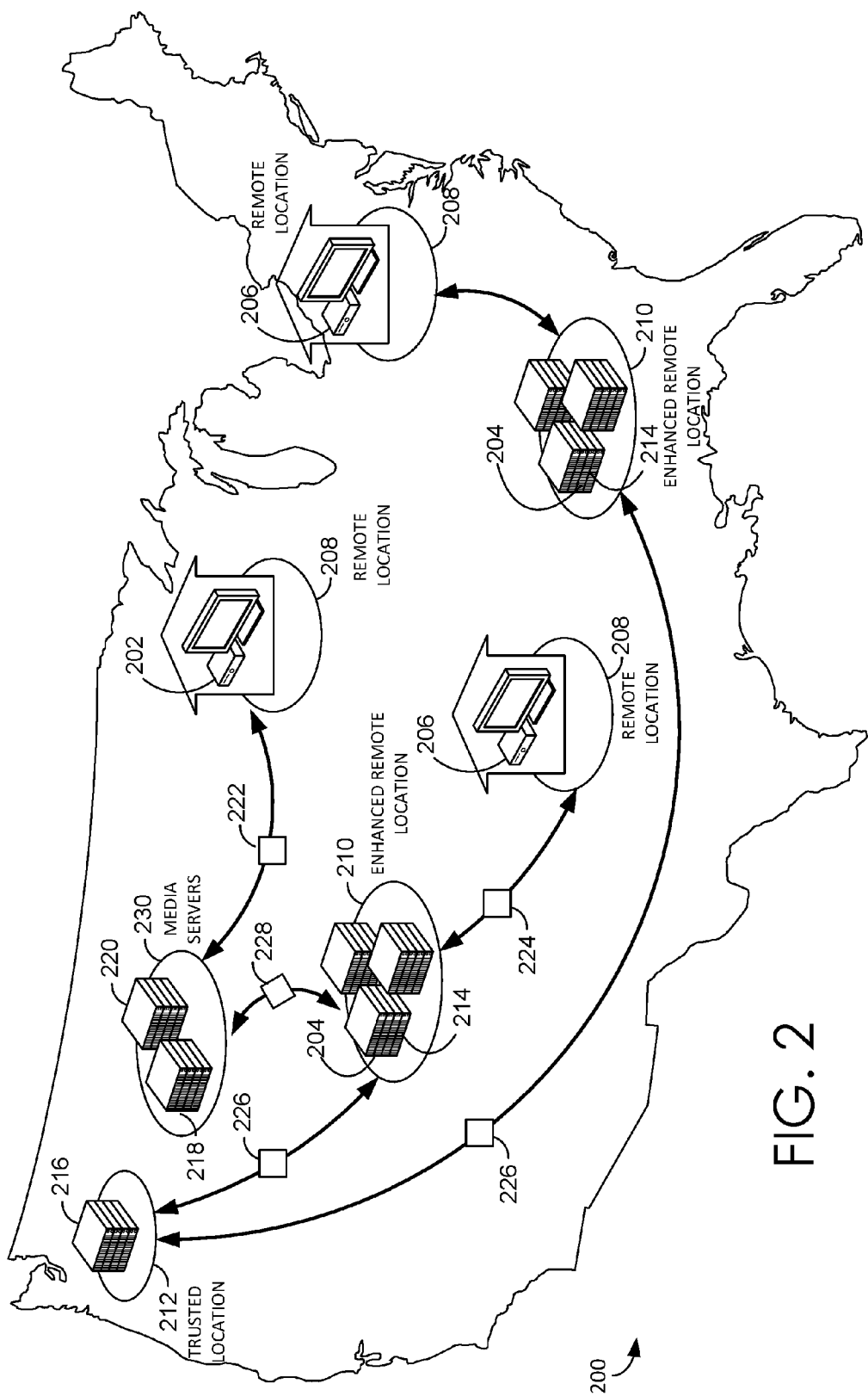
FIG. 2 is a diagram of a media content distribution service infrastructure for securing communications with enhanced media platforms, in accordance with an embodiment of the present invention.

Turning now to FIG. 2, a media content distribution service infrastructure 200 (hereinafter "infrastructure") comprising multiple computing devices that can provide secured enhanced communication is shown, in accordance with embodiments of the present invention. The infrastructure 200 shown in FIG. 2 is an example of one suitable infrastructure. The infrastructure 200 comprises multiple computing devices similar to the computing device 100 described with reference to FIG. 1. The infrastructure 200 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the network environment.

The infrastructure 200 may include a media platform 202, an enhanced media platform 204, a media access client 206, a remote location 208, an enhanced remote location 210, a trusted location 212, an external security component 214, an internal security component 216, media content server 218, a content delivery server 220, all in a networked environment. The network may include, without limitation, one or more local area networks (LANs) and/or wide area networks (WANs). Such networking environments are commonplace in offices, enterprise-wide computer networks, intranets and the Internet. Accordingly, the network is not further described herein.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The media platform 202 may be a game console, media console, or other suitable computing device that provides access to media content. Media content may be games, movies, applications, music, videos, television shows, and other media content. In particular, the game console may be coupled to a display, such as a television or monitor. The media platform 202 may be configured for household-based implementation. A household-based implementation would include and/or exclude certain custom functionality configured specifically for a household-based implementation media platform. In particular, certain security checks/procedures may be implemented specifically for a media platform determined to be running from a household. For example, the media platform 202 may access content delivery server 220 based on running in a household and also complete security checks implemented when accessing the content delivery server 220 from a household. The use of the word household is not intended to be limiting but rather contemplates locations where consumer grade media platforms are used. A household implementation may be out of a remote location 208 that is different from an enhanced remote location 210 in that the media platform does not authenticate itself and also establish trust with remote location 208. Moreover, remote location 208 does not include additional components where the media platform is running to authenticate and establish trust with the remote location 208.

The architecture of media platform 202 is such that the media platform 202 supports content built by developers to run particularly on the media platform 202. For example, video game content in physical compact discs or downloaded add-on packs, demos and full games are distributed and configured to run on the architecture of the media platform 202. At a high level, the media platform architecture may describe the computing components of the media platform and the relationships between the computing components. For example, a media platform architecture may include a central processing unit, memory, power, bus, graphics processor, and variations thereof. The architectural components are considerations when developing content to run on the media platform 202. It is contemplated that if these architectural components are altered, the ability to adequately perform different tasks associated with utilizing the media content may be impacted.

An enhanced media platform 204 refers to a media platform that generally shares the same or a substantially similar architecture of a media platform; however, instead of a household-based implementation, the enhanced media platform 204 may be implemented via a datacenter (e.g., enhanced remote location 210). Sharing the same or substantially similar architecture refers to maintaining the architectural components so that the content developed to run on a media platform 202 can also run on the enhanced media platform 204 without requiring any fundamental alterations or substantial fundamental alterations to the developed media content. In embodiments, the enhanced media platform 204 may be a reconfigured media platform in the form of a blade server in a rack enclosure or a rack mountable computing component. Other types of configurations of the enhanced media platform 204 for implementation via a datacenter are contemplated within the scope of the present invention. The enhanced media platform 204, in particular, may be configured architecturally such that developers of media content do not have to separately create content for the enhanced media content. Existing content and newly developed content may be accessed via a media platform 202 in a household-based implementation and an enhanced media platform 204 in a datacenter-based implementation.

It is contemplated that the infrastructure 200 supports providing media content simultaneously to a plurality of media platforms 202 and a plurality of enhanced media platforms 204. While media platforms 202 may directly access 222 media content. A media access client 206 may be implemented to provide access 224 to the media content via the enhanced media platform 204. A media access client 206 may be a computing device that depends on enhanced media platform 204 in the enhanced remote location 210 to provide access to media content. For example, a user associated with an enhanced video game console in a datacenter may access video game content via the enhanced video game console using the media access client 206. The media access client 206 comprises hardware and/or software that facilitate accessing media content via the enhanced media platform 204.

As used herein, a datacenter generally refers to a structure housing computing systems and other associated components (e.g., telecommunications and storage). In particular, an enhanced remote location 210 may refer to a datacenter where an enhanced media platform 204 is stored. The enhanced remote location 210 may be geo-distributed with user access locality. In other words, the enhanced remote location 210 may be located such that enhanced media platforms 204 may be implemented in datacenters around the world to mitigate bandwidth, power consumption, and distance issues of a single data center. In this regard, a user may be served from a nearby datacenter, thereby reducing user response time and bandwidth consumption. Other benefits of geo-distributed datacenters and user locality are contemplated with embodiments of the present invention.

The enhanced remote location 210 may not be owned and/or controlled by the provider of media content distribution service. Because of this lack of ownership or control, it is possible that enhanced media platform 210 may be misappropriated for unsanctioned access to media content. As such, embodiments of the present invention provide securing enhanced media platform communications by performing security tasks; the enhanced media platform 204 authenticates itself, and then the authenticated enhanced media platform 204 establishes a bidirectional trust with the enhanced remote location 210 in which it is stored in order to operate and access media content. The enhanced remote location 210 may also have additional components that facilitate the authentication process between the enhanced media location 210 and a trusted location 212. It is contemplated that firmware and/or hardware updates may be downloaded onto the enhanced media platform 204 to facilitate performing these security tasks.

The trusted location 212 may be configured to authenticate the enhanced media platform. A trusted location 214 may be a datacenter as described herein. The trusted location 212 may further refer to a datacenter owned and/or controlled by the provider of the media content distribution service. The trusted location 212 may be a High Business Impact (HBI) datacenter. The HBI classification denotes that the components of the datacenter, if disclosed without authorization, could cause severe or catastrophic material loss to the information owner or relying parties. In this regard, the components of the datacenter are provided limited access and disclosure. Additional policies associated with an HBI classification are contemplated within the scope of the present invention. The HBI datacenter includes an HBI software installation rack that supports different components that comprise HBI material. It is contemplated that the HBI classification may be implemented at different levels of datacenter hierarchy, for example, HBI at a rack installation level. In this regard, the HBI procedures may be implemented for the HBI identified hierarchy level and not all components in the datacenter.

Communication of messages including authentication credentials and validation credentials may be facilitated by the external security component 214 and the internal security component 216. The external security component 214 may be located in the enhanced remote location 210 and the internal security component 216 may be located in the trusted location 212. Each may comprise a single device or multiple devices cooperating in their respective datacenters. For instance, components may comprise multiple devices arranged in a distributed environment that collectively provide the functionality described herein. Additionally, other components not shown may also be included within the network environment. In particular, the external security component 214 may include additional modules (e.g., networking components, web servers and proxy servers) and the internal security component 216 may also include additional modules (e.g., hardware security module, web servers and proxy servers) located on the HBI rack. In particular, a hardware security module may facilitate processes for providing securing communications 226 using the enhanced media platform 204. The hardware security may be implemented as a computing device that safeguards and manages digital keys for strong authentication and providing crypto-processing.

Media content server 218 stores and shares media content. The media content server 218 may provide access to video, audio, photo, books, and also video games. In particular, a media content server may include video game binaries of a third party developer that are communicated 228 to the enhanced media platform 204. The media content server 218 may be part of a content delivery network 230 that supports the content delivery server 220. The content delivery server 220 is an exemplary server of multiple servers deployed in multiple data centers across the internet to serve content to users with high availability and high performance. Access to media content server 218 and/or the content delivery server 220 may be through the content delivery network 230. The content delivery network 230 may be accessed by either the media platform or the enhanced media platform based on corresponding supported functionality to provide access to media content.

By way of example, a first user may use a media platform 204 at his home to play a compact disc version of a video game. The first user may also have an account with the media content distribution service provider and further access 222 additional features of the video game through the content delivery server 220 or additional content through the media server 218. A second user may use a media access client 206 to access a video game via an enhanced media platform 204 in a datacenter. The enhanced media platform performs an authentication and trust process 226 and then retrieves 228 either game binaries from a media server 218 or additional video content from the content delivery server 220 while utilizing custom functionality based on the secured access provided to the enhanced media platform.

Retrieving game binaries based on custom functionality can specifically include excluding the enhanced media platform from security checks/procedures that may have been otherwise implemented. In this regard, the enhanced media platform with an established bidirectional trust with the enhanced remote location circumvents security checking thus limiting the security-related overhead and resources at the media server 218 and content delivery server 220. In one embodiments, enhanced media platforms may be associated with group designations that allow for enhanced privileges in not only circumventing security tasks but also in accessing particular game content and interacting with media delivery service components and other similarly placed users with enhanced media platforms. Other variations and combinations of group privileges and access privileges based on the enhanced media platform status are contemplated with embodiments of the present invention.

With reference to FIGS. 3A-3D, exemplary illustrations of securing communications with an enhanced media platforms are provided. In particular, an enhanced media platform may be authenticated based on messages communicated between a plurality of components and then validated for communication with an enhanced remote location such that a bidirectional trust is established between the authenticated enhanced media platform and the enhanced remote location. The plurality of components may comprise an enhanced remote location 310 having an enhanced media platform 312, and an external security component 314, and a trusted location 320 having an internal security component 322. The internal security component 322 may further have a cipher proxy 324 and a cipher device 326. The enhanced media platform 312 may further communicate with one or more components in the infrastructure (e.g., a content delivery server 330) to receive media content. It is contemplated that upon authenticating and/or establishing the bidirectional trust relationship with the enhanced remote location, the enhanced media platform 312 may communicate with the one or more components based on custom functionality having varying levels of privilege and access.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Securing communications with an enhanced media platform 312 may be provided at least in part based on cryptography. Cryptography generally refers to techniques for protecting privacy of stored or communicated information. Cryptography may include using secret key (symmetric, shared key, private key, and one key) and public key techniques. Other types of implementations of cryptography are contemplated within the scope of the present invention. The plurality of components described above use cryptography for encoding or encrypting communications to authenticate the enhanced media platform 312 and then the authenticated enhanced media platform 312 establishes a bidirectional trust with the enhanced remote location 310. The meaning of the communicated messages between components is kept hidden and only individual components authorized to access the communicated messages may decode or decrypt the messages during the authentication process.

Embodiments of the present invention may advantageously use asymmetric-key also known as public key cryptography. Public key cryptography uses a pair of keys that are mathematically related in such a way that information can be encrypted with a key and decrypted with the other. However, one key cannot be created from the other. The key pair consists of a private key that must be kept secret and a "public" key that can be distributed widely. Public key cryptography may be used for encryption and validation. With public encryption a message can be encrypted with a public key and transmitted over to the owner of the private key. Only the holder of the private key will be able to decrypt the original message. Authentication can be achieved by encrypting a message with a sender's private key. Receivers who possess the corresponding sender's public key will be able to decrypt the message and therefore know that the message is authentic because only the owner of the private key could have encrypted it.

The enhanced remote location 310 may communicate encrypted authentication credentials to the trusted location 320 in order for the enhanced media platform 312 to authenticate itself. The authentication credentials may support a possession-based authentication scheme by which authentication is based on possessing a certificate that identifies the enhanced media platform 312. In embodiments, the authentication credentials includes additional security in the communicated messaged (e.g., a nonce—an arbitrary number used only once during the authentication process). The authentication credentials may include a certificate and a nonce that are encrypted with a public key and then communicated to authenticate the enhanced media platform 312. It is contemplated that manufacture-based secure authentication information that may include the public key may be used to provide hardware cryptography. For example, the secure information that includes the public key may be added to the enhanced media platform 312 during a manufacturing process. The secure authentication information may include information used to identify the enhanced media platform (e.g., serial number, manufacturer information, cryptography data). In this regard, the manufacture-based secure authentication information may be used to specifically authenticate the enhanced media platform 312 using manufacture-based security checks. In particular, the public key is used with a cipher—an algorithm for encryption and decryption—to encrypt the authentication credentials. The encrypted authentication credentials may be referred to as a cipher challenge. The authentication credentials are forwarded over a transmission medium. The transmission medium may use internet protocol security (IPSec) for securing the communications. IPsec authenticates and encrypts each IP packet of the communication session.

The trusted location 320 may receive the authentication credentials and upon validating the authenticity of the enhanced media platform communicate validation credentials to the enhanced media platform 312. In embodiments, a cipher proxy 324 and a cipher device 326 may be used in validating the authenticity of the enhanced media platform 312. In particular, the cipher proxy 324 signs the certificate in the authentication credentials to vouch for the authenticity. Validating the authenticity includes decrypting the encrypted authenticated credentials with a private key to validate the certificate of the enhanced media platform 312. The process, in particular, may verify the manufacture-based secure authentication information to confirm the enhanced media platform 312 was built using a sanctioned manufacturing process. The cipher proxy 334 then communicates the signed certificate to the cipher device 336. The cipher device may generate validation credentials. Validation credentials may include similar information in the authentication credentials (e.g., identification information of the enhanced media platform, public key). The validation credentials may be used by the enhanced media platform 312 to validate the enhanced remote location 310. The validation credentials may in particular include a certificate. The certificate may be generated using an X.509 system as a certification authority such that the certificate is signed with a root certificate or root authority. It is contemplated that the certificate may be issued for a limited lifespan and renewed at a predetermined interval via methods described herein. The lifespan and the renewal interval periods may be different. The validation credentials are communicated through the transmission medium.

The enhanced remote location 310 receives the validation credentials. In embodiments, the external security component 314 may receive the validation credentials and forward the certificate of the validation credentials to the enhanced media platform 312. Because the certificate may be issued for a limited lifespan, the external security component 314 may be configured to communicate with the enhanced media platform 312 to renew the certificate at a predetermined interval via methods described herein. The lifespan and the renewal interval periods may be different in duration. The certificate may be forwarded along with a nonce. The enhanced media platform 312 verifies that the certificate of the X.509 authority is rooted against a root certificate. In this regard, the enhanced media platform 312 may establish a unilateral trust with the enhanced remote location 310. The enhanced media platform 312 is now authenticated and a unilateral trust exists on the part of the enhanced media platform confirming the enhanced media platform is running in an enhanced remote location 310.

The authenticated enhanced media platform 312 then requests additional information in the validation credentials. It is contemplated that upon verifying the X.509 certificate, communications between the enhanced media platform and the external security component may occur using mutual authentication secure socket layer/transport layer security (SSL/TLS) based on the X.509 certificate. The additional information (e.g., identification information of the enhanced media platform) in the validation credentials are returned to the enhanced media platform 312. Upon receiving the additional information in validation credentials, the authenticated enhanced media platform establishes a bidirectional trust with the enhanced remote location 310. In embodiments, the validation credentials are communicated along with challenge credentials (e.g., trust-establishing Blob). The challenge credentials are issued by the external security component 314 to the enhanced media platform 312. The challenge credentials may be used to authenticate the enhanced media platform 312 against one or more media servers, including a content delivery server 330, for communicating media content.

It is contemplated with embodiments of the present invention that the enhanced media platform may have firmware and/or software updates to facilitate establishing the unilateral trust and the bilateral trust. In particular, updates may facilitate access to information needed to verify the validation credentials. For example, the enhanced media platform upon the update may have access to the public key in the HBI rack in the external security component. Also, by way of example, the enhanced media platform may have access to a certificate chain of the X509 certificate provided in the validation credentials. Other types of functionality that may be facilitated via firmware and/or software updates during the authentication process are contemplated with embodiments of the present invention.

Figure 3A:
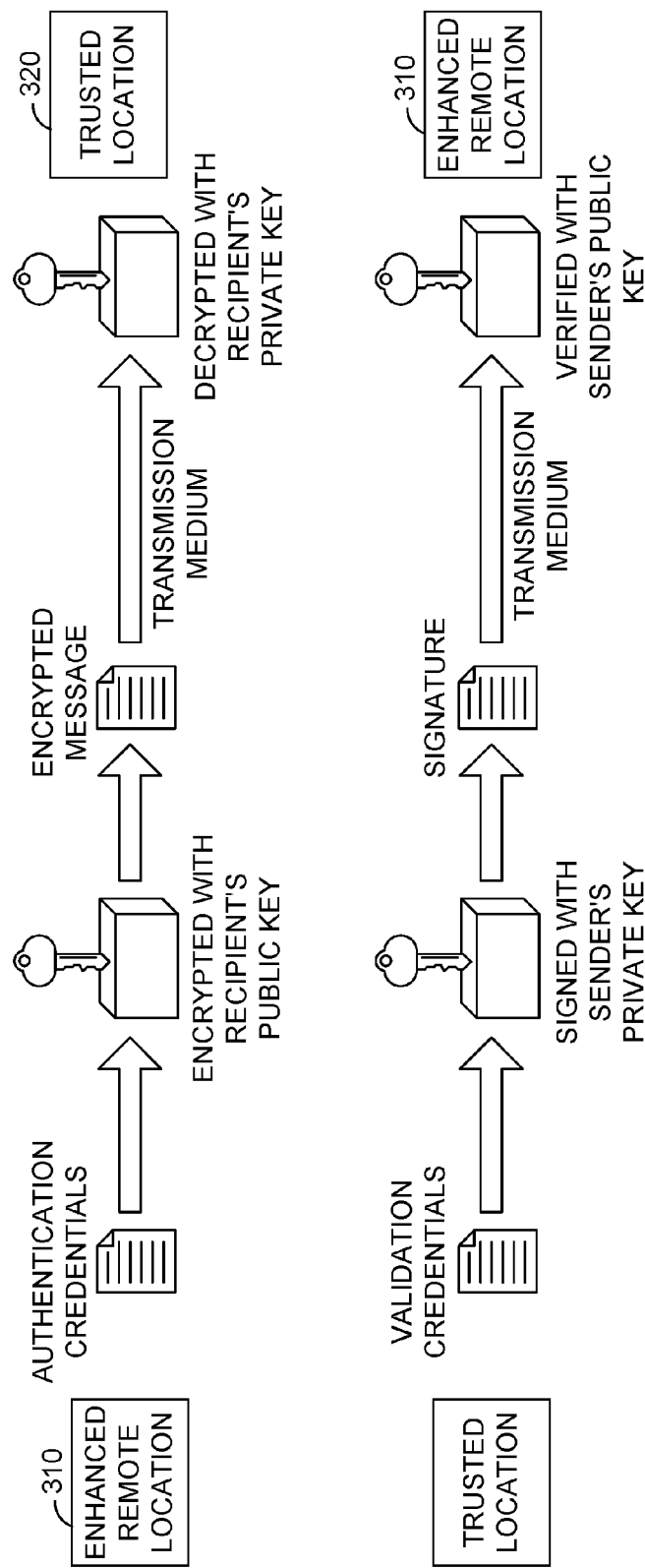
FIGS. 3A-3D are diagrams depicting messages communicated for securing communications with enhanced media platforms, in accordance with an embodiment of the present invention.
Figure 3B:
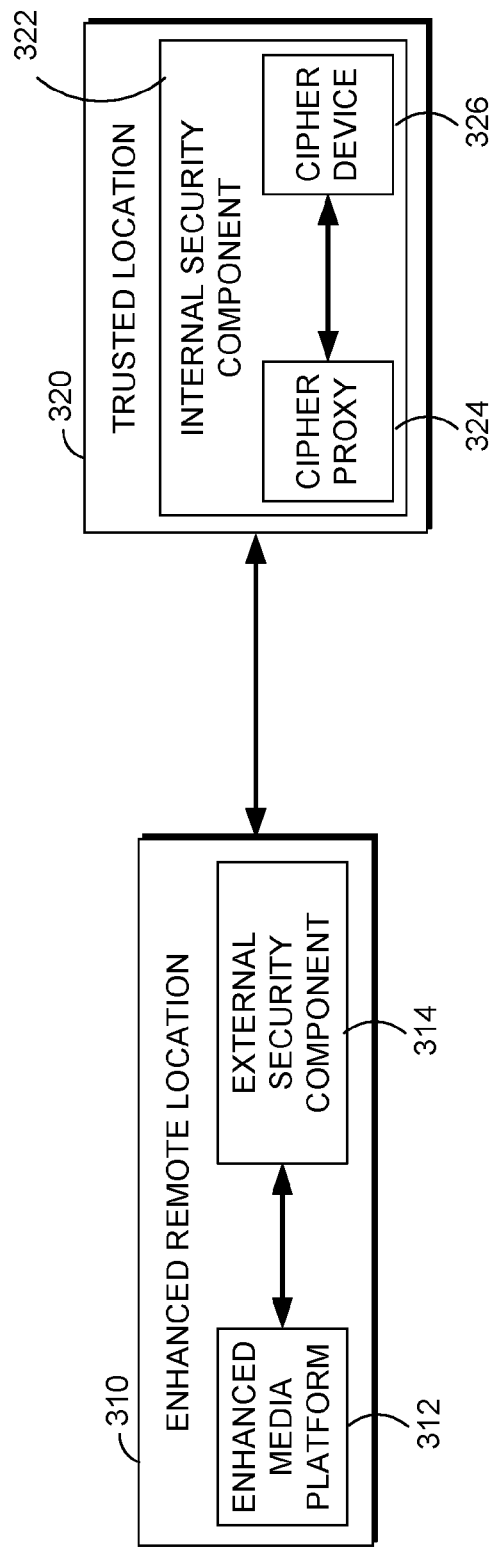
Figure 3C:
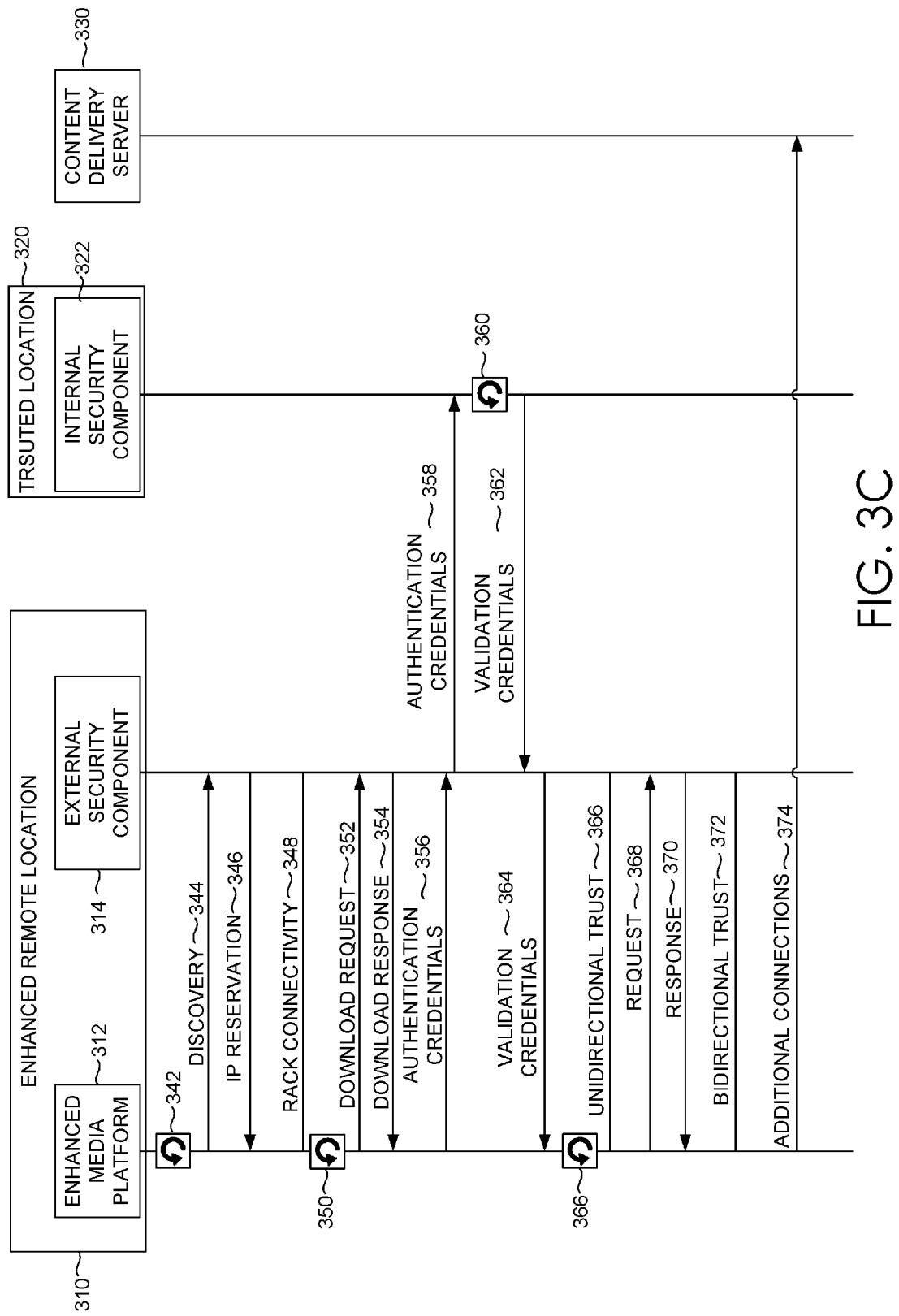

With reference to FIG. 3C, a sequence diagram is depicted of securing communications with enhanced media platforms. The diagram includes an enhanced remote location 310, enhanced media platform 312, external security component 314, trusted location 320, internal security component 322, and content delivery server 330, as described above. The enhanced media platform 312 may include manufacture-based secure authentication information that includes a public key for cryptography. The secure authentication information may be embedded in the hardware of the enhanced media platform 312 during a secure manufacturing process of the enhanced media platform. The enhanced media platform 312 may be located in an enhanced remote location 310 that is a datacenter housing the enhanced media platform 312 and additional components (e.g., the external security component) that facilitate securing communications. The enhanced remote location 310 may be geo-distributed to support user locality, as such, the enhanced remote location may not be owned and/or controlled by a provider of the media content distribution server.

The enhanced media platform 312 may be configured to perform an initialization 342 that boots the enhanced media platform, performs a discovery 342 of physical devices, reserves an IP 346 for the enhanced media platform and discovers the external security component 314. The physical devices may include components (e.g., DHCP, switch, chassis manager) in the enhanced remote location that support the enhanced media platform 312. The discovery process may include messages communicated such that the enhanced media platform is granted an IP and receives information (e.g., IP address) on the external security component. The enhanced media platform 312 may establish connectivity 348 without a secure trust with the external security component and other components. In embodiments, the implementation and communication of messages may be at a rack level. Upon establishing connectivity, it is contemplated that an update process 350 may be implemented to receive firmware and/or software updates that facilitate access to and control of the enhanced media platform 312. In embodiments, the enhanced media platform may request 352 and then receive 354 the update information.

The enhanced media platform 312 may communicate authentication credentials 356 to the trusted location 320. The enhanced media platform 312 may in particular communicate the authentication credentials via the external security component which then forwards the authentication credentials 358 to the internal security component 322. The authentication credentials may include manufacture-based secured authentication information and a public certificate that identifies the enhanced media platform. In embodiments, the authentication credentials includes a nonce—an arbitrary number used only once during the authentication process.

The trusted location 320 may receive the authentication credentials 358 and upon validating 360 the authenticity of the enhanced media platform communicate validation credentials 362 to the enhanced media platform. In embodiments, a cipher proxy 324 and a cipher device 326 may be used in validating the authenticity of the enhanced media platform 312. Validating may include signing the certificate in the authentication credentials by verifying the manufacture-based secure authentication information to confirm the enhanced media platform 312 was built using a sanctioned manufacturing process. Validating may also include generating validation credentials. The validation credentials 362 may include a certificate and identification information of the enhanced media platform. The certificate may be generated using an X.509 system as a certification authority such that the certificate is signed with a root certificate. The validation credentials 362 are communicated to the enhanced remote location.

The enhanced remote location 310 receives the validation credentials 362. The external security component 314 may receive the validation credentials 362 and forward the validation credentials 364. In embodiments, the external security component forwards the certificate of the validation credentials to the enhanced media platform 312. The certificate may be forwarded along with a nonce for additional security. The authenticated enhanced media platform 312 verifies 366 that the certificate of the X.509 authority is rooted against a root certificate. In this regard, the enhanced media platform 312 may establish a unilateral trust 366 with the enhanced remote location 310.

The enhanced media platform 312 then requests 368 additional information in the validation credentials. The additional information in the validation credentials is returned 370 to the enhanced media platform 312. Upon receiving the additional information in validation credentials, the enhanced media platform establishes a bidirectional trust 372 with the enhanced remote location 310. In embodiments, the bidirectional trust is based on matching identification information of the enhanced media platform 312 in the additional information in the validation credentials to the manufacture-based secure authentication information. The enhanced media platform 312 may establish additional connections 374 to securely communicate with media content distribution service infrastructure (e.g., content deliver server 330) and also operate with additional custom functionality such as, enhanced privileges that include bypassing security checks. For example, when a media access client is accessing content via an enhanced media platform 312, the enhanced media platform 312 may not have to perform certain security checks.

Figure 3D:
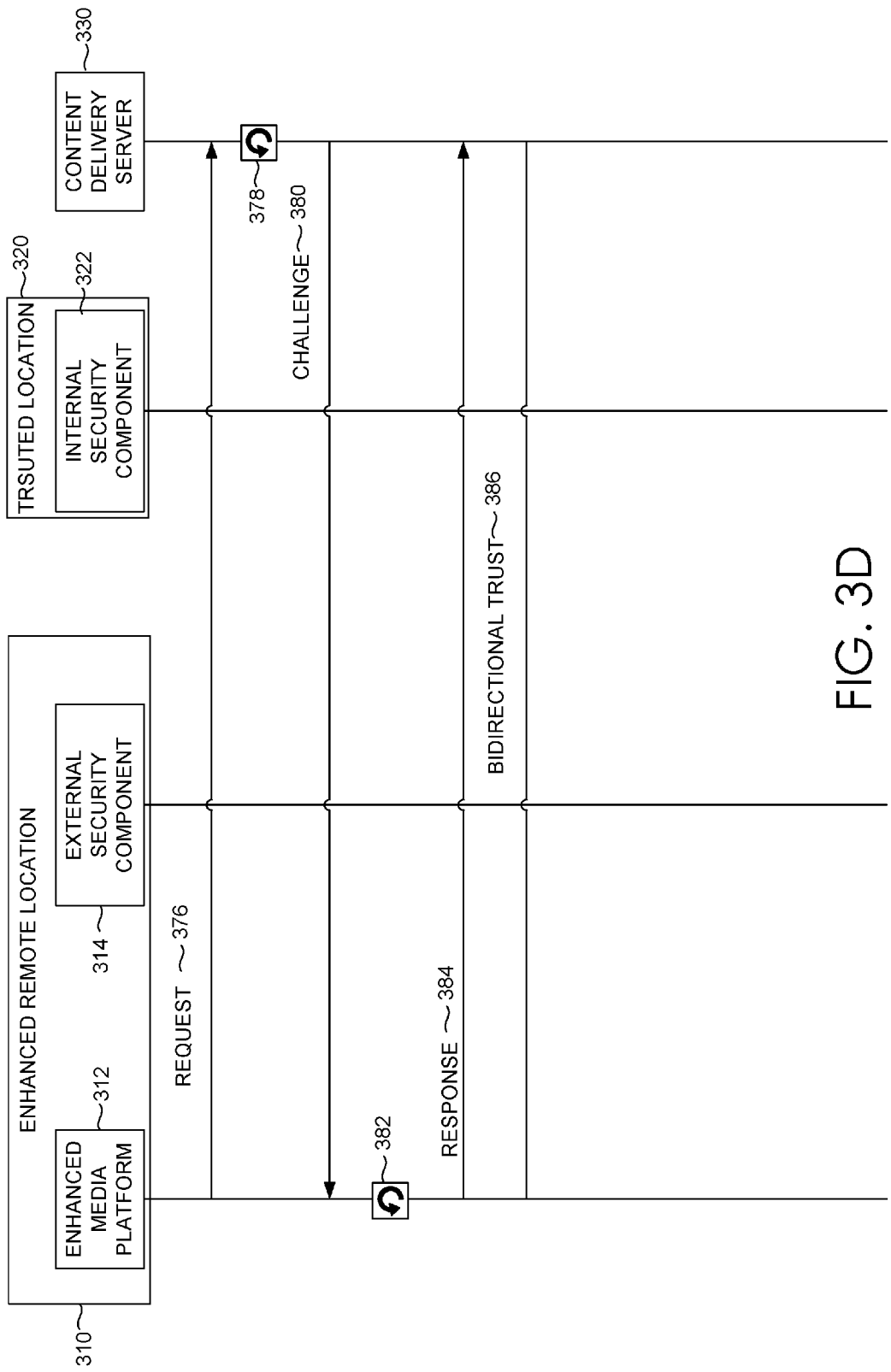

With reference to FIG. 3D, the enhanced media platform 312 may establish a trust relationship with other components in the infrastructure to communicate with the components with enhanced privileges. Enhanced privileges with other components may be initialized based on communicating the validation credentials along with challenge credentials (e.g., trust-establishing Blob). It is contemplated that the challenge credentials may be requested and communicated separately from the validation credentials. The challenge credentials refer to a secret data Blob that the external security component 314 issues to the enhanced media platform 312. The challenge credentials may be used to authenticate the enhanced media platform 312 against one or more external servers, including a content delivery server 330, for communicating media content. Enhanced media platform 312 may operate with custom functionality, based on using the challenge credentials to establish a trust with the one or more components of the media content distribution service; the custom functionality comprises running with enhanced privileges that include bypassing one or more security checks that otherwise would be executed.

In operation, the enhanced media platform 312 may request 376 a connection with the content delivery server 330. At 378, the content delivery server 330 makes a determination whether the request is associated with an enhanced media platform. Determining that the request is associated with an enhanced media platform or a media platform may be based on the source of the request, a group designation, and/or additional information included in the request. For example, the request may be associated with an enhanced media platform that is part of a security group with access privileges and security permissions based on previously being authenticated. In embodiments, the request from the enhanced media platform 314 may include validation credentials that communicate to the content delivery server that the request is associated with an enhanced media platform.

When the content delivery server 330 determines that the request is not associated with an enhanced media platform, the content delivery server 330 proceeds with security tasks (e.g., checks and procedures) for authenticating a device associated with the request and providing access to the media content upon authentication. When the content delivery server determines that the request is associated with an enhanced media platform, regular security checks can be bypassed in order to establish a bidirectional trust and custom functionality implemented for the enhanced media platform 314. For example, the content delivery server 330 may issue a request and/or issue a challenge 380 for challenge credentials associated with the enhanced media platform 312. In embodiments, the challenge credentials refer to a secret data Blob that the external security component 314 issues to the enhanced media platform 312. The enhanced media platform 314 authenticates 382 the challenge using the challenge credentials such that a bidirectional trust 386 is established between the enhanced media platform 312 and the content delivery server 320. The enhanced media platform 312 may respond 384 to the challenge in order to answer the challenge. Responding to the challenge can include communicating challenge credentials to the content delivery server. In particular, the enhanced media platform 312 can hash the challenge credentials and communicate them to the content deliver server 330. It is contemplated that the content delivery server 330 may be associated with additional components which upon authenticating the enhanced media platform 312, the enhanced media platform 311 may begin communicating with the additional components with enhanced privileges and circumventing additional security checks.

Figure 4:
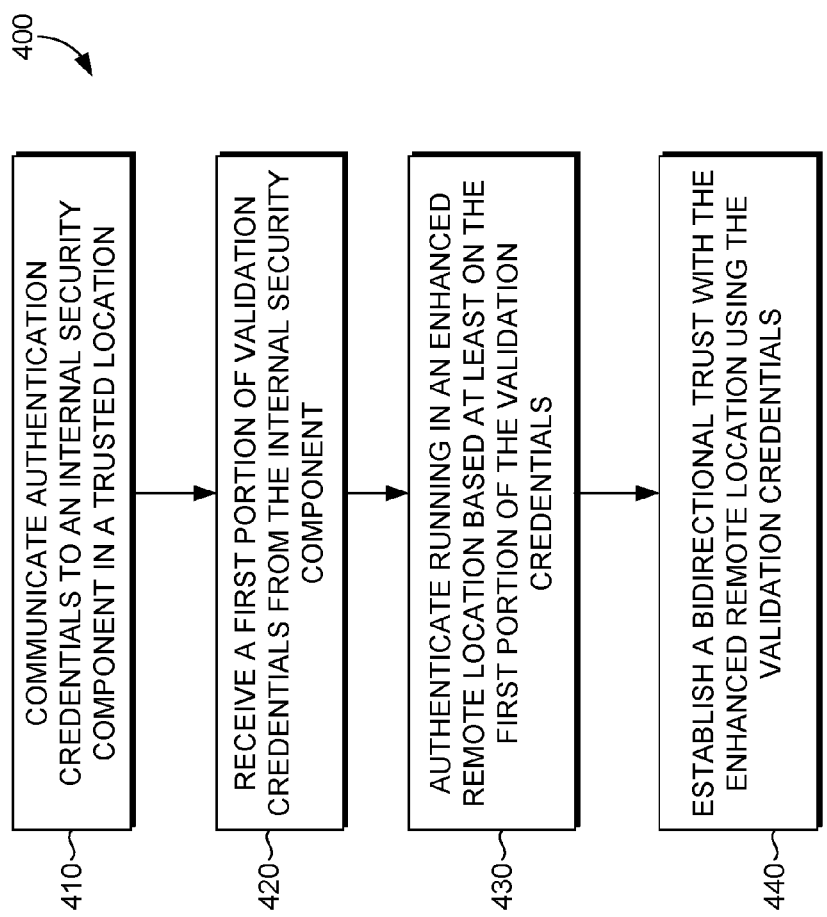
FIG. 4 is a flow diagram showing a method for securing communications with enhanced media platforms, in accordance with embodiments of the present invention.

Turning now to FIG. 4, a flow diagram is provided that illustrates a method 400 for securing communications with enhanced media platforms. Initially at block 410, authentication credentials are communicated to an internal security component at a trusted location. At block 420, a first portion of validation credentials are received from the internal security component. At block 430, running in an enhanced remote location is authenticated based at least on a first portion of the validation credentials. At block 440, a bidirectional trust is established with the enhanced remote location using the validation credentials.

Figure 5:
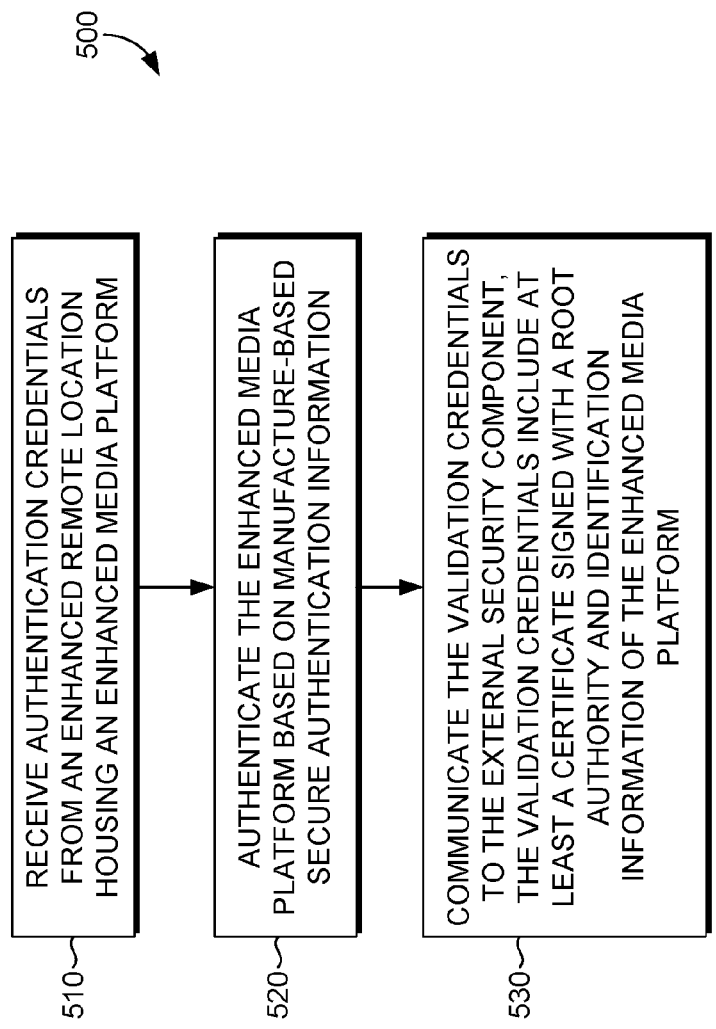
FIG. 5 is a flow diagram showing a method for securing communications with enhanced media platforms, in accordance with embodiments of the present invention.

Turning now to FIG. 5, a flow diagram is provided that illustrates a method 500 for securing communications with enhanced media platforms. Initially at block 510, authentication credentials are from an enhanced remote location. The enhanced remote location includes an external security component and an enhanced media platform. At block 520, the enhanced media platform is authenticated. At block 530, the validation credentials are communicated to the external security component. The validation credentials include at least a certificate signed with a root authority and identification information of the enhanced media platform. The validation credentials establish a bidirectional trust between the enhanced media platform and the enhanced remote location.

Figure 6:
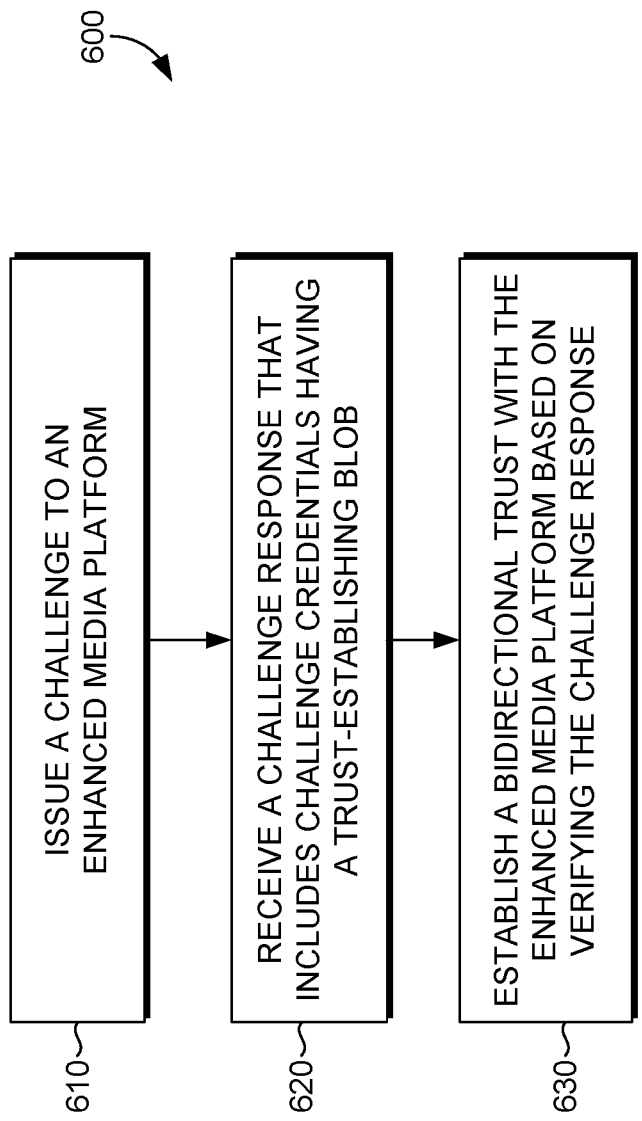
FIG. 6 is a flow diagram showing a method for securing communications with enhanced media platforms, in accordance with embodiments of the present invention.

Turning now to FIG. 6, a flow diagram is provided that illustrates a method 600 for securing communications with enhanced media platforms. Initially at block 610, a challenge is issued to an enhanced media platform. The challenge may be issued based on detecting the enhanced media platform attempting to make a connection. At block 620, a challenge response is received, wherein the challenge response includes challenge credentials having a trust-establish Blob. At block 630, establishing a bidirectional trust with the enhanced media platform based on verifying the challenge response.

Figure 7:
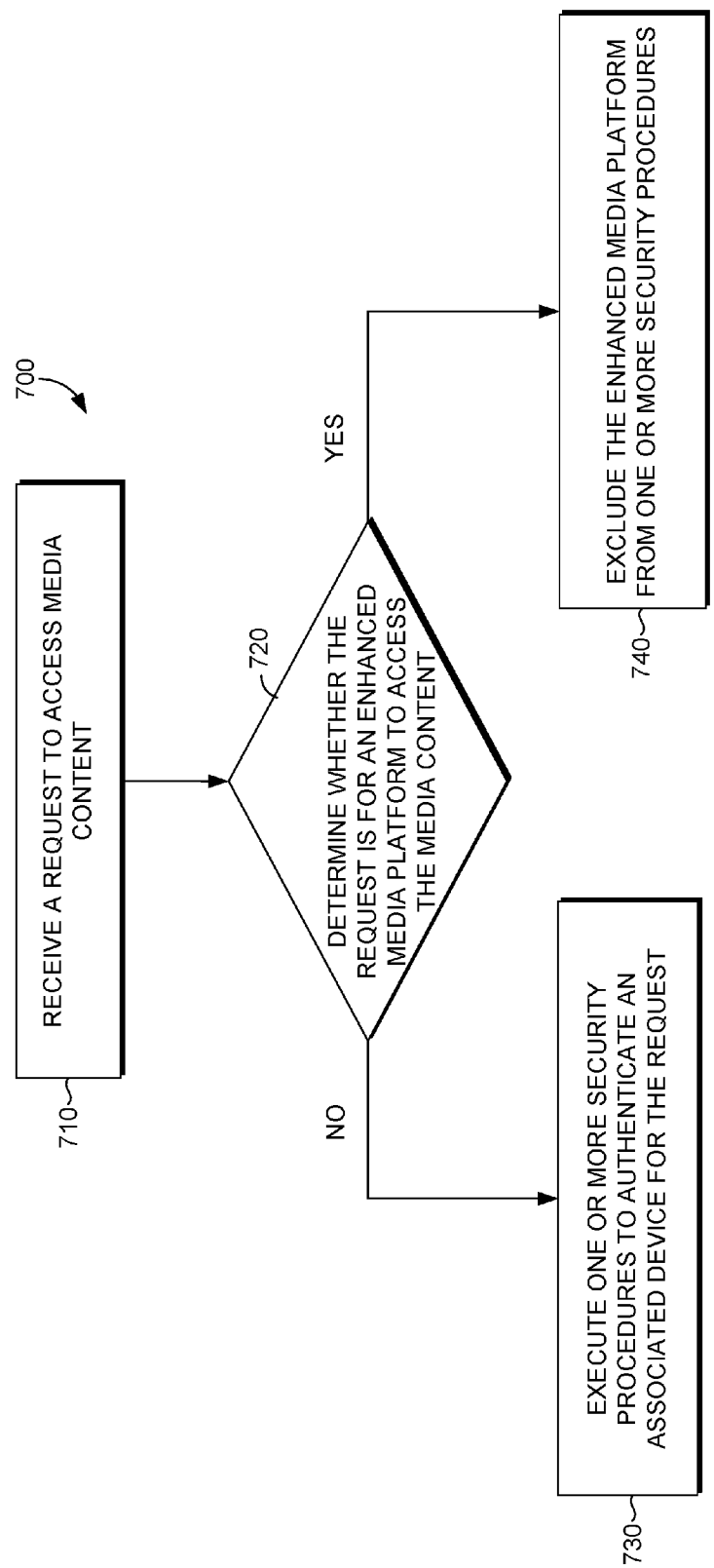
FIG. 7 is a flow diagram showing a method for securing communications with enhanced media platforms, in accordance with embodiments of the present invention.

Turning now to FIG. 7, a flow diagram is provided that illustrates a method 700 for securing communications with enhanced media platforms. Initially at block 710, a request is received. The request may be to access media content. The request may also be to establish a connection with a content delivery server such that media content may be communicated from the content delivery server. At block 720, a determination whether the request is for an enhanced media platform to access the media content is determined. In embodiments, the request from the enhanced media platform 314 may include validation credentials that communicate to the content delivery server that the request is associated with an enhanced media platform. At block 730, when it is determined that the request is not associated with an enhanced media platform, one or more security procedures to authenticate a device associated with the request are executed. At block 740, when it is determined that the request is associated with an enhanced media platform, the enhanced media platform is excluded from one or more security procedures that would have otherwise been executed. Instead, the enhanced media platform may establish a bidirectional trust between the enhanced media platform and the content delivery server, in accordance with embodiments of the present invention.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method for securing communications with enhanced media platforms in a media content distribution service, the method comprising:

communicating, from an enhanced media platform in an enhanced remote location, authentication credentials to an internal security component in a trusted location, wherein the internal security component in the trusted location operates services to authenticate, based on the authentication credentials, that the enhanced media platform is running in the enhanced remote location;

receiving, at the enhanced media platform, a first portion of validation credentials from the internal security component;

authenticating, at the enhanced media platform that the enhanced media platform is running in the enhanced remote location based at least on the first portion of the validation credentials;

communicating a request to an external security component, in the enhanced remote location, for at least a second portion of the validation credentials;

receiving the second portion of the validation credentials;

establishing a bidirectional trust with the enhanced remote location using the second portion of the validation credentials, wherein the second portion of the validation credentials are communicated upon authenticating the enhanced media platform is running in the enhanced remote location; and using the enhanced media platform, retrieving media content from a content delivery server associated with the media content distribution service, wherein the enhanced media platform, based at least in part on establishing the bidirectional trust with the enhanced remote location and establishing a second bidirectional trust between the enhanced media platform and the content delivery server, accesses the content delivery server using custom functionality that includes running with enhanced privileges.

2. The method of claim 1, further comprising wherein prior to communicating authentication credentials:

initializing, in the enhanced media platform, via messages with an external security component;

establishing connectivity with the external security component without a secure trust with the external security component; and performing an update based on information received from the external security component.

3. The method of claim 2, wherein the authentication credentials are communicated using cryptography via the external security component, wherein the authentication credentials include at least manufacture-based secure authentication information having a public key and a certificate that is encrypted with the public key.

4. The method of claim 3, wherein the manufacture-based secure authentication information is embedded in hardware during a manufacturing process.

5. The method of claim 4, wherein the validation credentials are received via the external security component, wherein the validation credentials are communicated based on an internal security component:

decrypting the authentication credentials with a private key;

signing the certificate in the authentication credentials; and generating the validation credentials that include a certificate signed with a root authority.

6. The method of claim 1, wherein the first portion of the validation credentials includes a certificate signed with a root authority.

7. The method of claim 1, wherein the second portion of the validation credentials include at least a certificate signed with a root authority having identification information that are matched with the identification information with manufacture-based secure authentication information in the authentication credentials in order to establish the bidirectional trust.

8. The method of claim 1, wherein the request is communicated to the external security component using mutual authentication based on the first portion of the validation credentials having a certificate signed with a root authority.

9. The method of claim 1, wherein establishing the second bidirectional trust with the content delivery server is based on:
communicating, to the content delivery server, a request for media content;
receiving a request for challenge credentials, wherein the challenge credentials facilitate establishing the second bidirectional trust, the second bidirectional trust is between the enhanced media platform and the content delivery server; and
communicating the challenge credentials, wherein the challenge credentials are used to authenticate the enhanced media platform running with enhanced privileges such that additional security checks are circumvented for communicating media content from the content delivery server to the enhanced media platform.

10. The method of claim 9, wherein upon receiving the request for media content, the content delivery server determines that the request is associated with the enhanced media platform running with enhanced privileges based on one more of the following: a source of the request; a group designation of the request; or validation credentials included in the request.

11. One or more computer storage media storing computer-useable instructions that, when used by one or more computing devices, cause the one or more computing devices to perform a method securing enhanced media platforms, the method comprising:
receiving, at a content delivery server, a request for media content;
determining, using the content delivery server, that the request is associated with an enhanced media platform running with enhanced privileges, wherein the enhanced privileges are associated with the enhanced media platform based on the enhanced media platform establishing a bidirectional trust with an enhanced remote location using validation credentials; and
establishing a second bidirectional trust between the enhanced media platform and the content delivery server based on challenge credentials,
wherein establishing the bidirectional trust at the enhanced media platform is based on:
communicating authentication credentials;
receiving at least a first portion of the validation credentials;
authenticating that the enhanced media platform is running in the enhanced remote location based at least on the first portion of the validation credentials;
communicating a request for a second portion of the validation credentials;
receiving the second portion of the validation credentials; and
establishing the bidirectional trust with the enhanced remote location based on receiving the second portion of the validation credentials, wherein the second portion of the validation credentials are communicated upon authenticating the enhanced media platform is running in the enhanced remote location; and
upon determining that the request is associated with the enhanced media platform running with enhanced privileges, communicating media content to the enhanced media platform.

12. The media of claim 11, wherein determining that the request is associated with the enhanced media platform running with enhanced privileges is based on one more of the following: a source of the request; a group designation of the request; or validation credentials included in the request.

13. The media of claim 11, wherein determining that the request is associated with the enhanced media platform running with enhanced privileges, further comprises requesting challenge credentials having a trust-establishing blob, wherein the challenge credentials facilitate establishing a second bidirectional trust, the second bidirectional trust is between the enhanced media platform and the content delivery server.

14. The media of claim 13, further comprising, in response to requesting challenge credentials, receiving the challenge credentials, wherein the challenge credentials are used to authenticate the enhanced media platform running with enhanced privileges such that additional security checks are circumvented for communicating media content from the content delivery server to the enhanced media platform.

15. A system for securing communications with enhanced media platforms, the system comprising:
a processor; and
a memory storing instructions, wherein the processor executes the instructions to implement:
an enhanced media platform configured for:
communicating authentication credentials;
receiving at least a first portion of validation credentials;
authenticating that the enhanced media platform is running in an enhanced remote location based at least on the first portion of the validation credentials;
communicating a request for a second portion of the validation credentials;
receiving the second portion of the validation credentials;
establishing a bidirectional trust with the enhanced remote location based on receiving the second portion of the validation credentials, wherein the second portion of the validation credentials are communicated upon authenticating the enhanced media platform is running in the enhanced remote location; and
establishing a second bidirectional trust between the enhanced media platform and a content delivery server; and
the content delivery network server configured for:
receiving a request for media content;
determining that the request is associated with the enhanced media platform running with enhanced privileges, wherein the enhanced privileges are associated with the enhanced media platform based on the enhanced media platform establishing the bidirectional trust with the enhanced remote location using the first portion of the validation credentials and the second portion of the validation credentials and establishing the second bidirectional trust between the enhanced media platform and the content delivery server based on challenge credentials; and
upon determining that the request is associated with the enhanced media platform running with enhanced privileges, communicating media content to the enhanced media platform.

16. The system of claim 15, further comprising, the processor implementing:
  an external security component configured for:
   communicating the authentication credentials to a trusted location:
   receiving the validation credentials from the trusted location:
   communicating at least the first portion of the validation credentials to the enhanced media platform:
   receiving the request for the second portion of the validation credentials; and
   communicating the second portion of the validation credentials; and
  an internal security component configured for:
   receiving the authentication credentials, wherein the internal security component in the trusted location operates services to authenticate, based on the authentication credentials, that the enhanced media platform is running in the enhanced remote location:
   authenticating the enhanced media platform: and
   communicating the validation credentials to the external security component.

17. The system of claim 15, wherein determining that the request is associated with the enhanced media platform running with enhanced privileges, further comprises the content delivery server configured to request challenge credentials, wherein the challenge credentials facilitate establishing the second bidirectional trust, the second bidirectional trust is between the enhanced media platform and the content delivery server.

18. The system of claim 17, further comprising, the content delivery server configured to, in response to requesting challenge credentials, receive the challenge credentials, wherein the challenge credentials are used to authenticate the enhanced media platform running with enhanced privileges such that additional security checks are circumvented for communicating media content from the content delivery server to the enhanced media platform.

19. The system of claim 18, further comprising, the content delivery server configured to determine that the request is not associated with the enhanced media platform running with enhanced privileges, such that, the content delivery server proceeds with security tasks for authenticating the enhanced media platform prior to providing access to media content.

20. The system of claim 15, wherein the enhanced media platform is further configured for:
  initializing via messages with the external security component in the enhanced remote location;
  establishing connectivity with the external security component without a secure trust with the external security component; and
  performing an update based on information received from the external security component.

* * * * *